United States Patent
Banss et al.

(10) Patent No.: US 10,871,867 B1
(45) Date of Patent: Dec. 22, 2020

(54) DUAL RANGE CAPACITIVE MEMS FORCE SENSOR FOR TOUCH SCREEN APPLICATIONS

(71) Applicants: Ali Omar Nasser Banss, Toronto (CA); Ridha Ben-Mrad, Toronto (CA)

(72) Inventors: Ali Omar Nasser Banss, Toronto (CA); Ridha Ben-Mrad, Toronto (CA)

(*) Notice: Subject to any disclaimer, the term of this patent is extended or adjusted under 35 U.S.C. 154(b) by 0 days.

(21) Appl. No.: 16/745,943

(22) Filed: Jan. 17, 2020

(51) Int. Cl.
  *G06F 3/044* (2006.01)
  *G06F 3/041* (2006.01)

(52) U.S. Cl.
  CPC .......... *G06F 3/0445* (2019.05); *G06F 3/0412* (2013.01); *G06F 3/04146* (2019.05); *G06F 2203/04106* (2013.01)

(58) Field of Classification Search
  CPC ......... G06F 3/0412; G06F 2203/04106; G06F 3/044; G06F 3/04146
  See application file for complete search history.

(56) References Cited

U.S. PATENT DOCUMENTS

| | | | | |
|---|---|---|---|---|
| 7,673,528 B2 * | 3/2010 | Yoon | ...................... | G06F 3/0414 73/862.041 |
| 9,453,774 B2 * | 9/2016 | Bao | ........................ | G01L 7/041 |
| 2010/0321330 A1 * | 12/2010 | Lim | ...................... | G06F 3/0202 345/174 |
| 2015/0114814 A1 * | 4/2015 | Suzuki | ................. | H01H 13/702 200/5 A |
| 2017/0052616 A1 * | 2/2017 | Lin | ........................ | G06F 3/0447 |
| 2017/0160854 A1 * | 6/2017 | Huang | ................... | G06F 3/0445 |

* cited by examiner

*Primary Examiner* — Muhammad N Edun
(74) *Attorney, Agent, or Firm* — Nasser Ashgriz; UIPatent Inc.

(57) ABSTRACT

A capacitive MEMS force sensor for touch recognition and force measurement in touch screens is provided. The sensor includes two planar conductive electrodes separated by a predetermined distance using an elastic spacer to define an initial capacitance value of the sensor. An applied external force deforms the elastic spacer and minimizes the gap between sensor electrodes to alter the nominal capacitance value. This change in capacitance is monitored to measure the magnitude of the touch force. The sensor includes two types of the elastic spacers with different values of stiffness to overcome the trade-off between sensitivity and dynamic range of force measurement. These elastic spacers are interposed between sensor electrodes and are offset with a height difference to provide two ranges of force measurement.

19 Claims, 10 Drawing Sheets

DUAL RANGE CAPACITIVE MEMS FORCE SENSOR FOR TOUCH SCREEN APPLICATIONS

FIELD OF THE INVENTION

The present invention relates to the field of force-based touch interface to enable the development of capacitive touch screens that are pressure responsive, and can receive touch inputs from non-conductive objects such as gloved-fingers, pens and various types of styluses.

BACKGROUND OF THE INVENTION

Touch screens are input tools used to locate the position of the touch within the display panel of an electronic device. They are widely used in many industrial applications including smartphones, computer systems, cars navigations, game consoles and ATM machines. The common technologies of touch screens are resistive, capacitive, infrared and surface acoustic wave technology. Projective capacitive technology has dominated the touch industry due to its unique features and advantages. This technology enabled the recognition of multiple touches on the screen with high sensitivity, reliability and excellent optical properties. The concept behind this technology is based on the utilization of the conductive nature of human body. During touch, the internal electric field between sensor electrodes is disturbed by the presence of a human finger; this alters the nominal capacitance of the touch sensor to a new value, which is monitored by a touch controller to locate the position of the touch on the display of the device.

Despite the increasing use of capacitive touch screens in today's electronic devices, the technology is still limited in certain applications. Capacitive touch screens can only locate the x-y coordinates of the touch without any information about the magnitude of the touch force, limiting the number of inputs that can be generated during a user touch. The second limitation is the dependence of the technology on the conductive nature of human body. In these screens, it is not possible to enable the touch with heavy gloved-hands or a non-conductive stylus, restricting the use of the technology under certain industrial and environmental conditions. Adding to these limitations, the maximum size of the capacitive touch screen is limited due to its high sensitivity to electromagnetic fields as such screens are based on sensing very small capacitance changes in the femtofarad.

Measuring the magnitude of the touch force was one of the main approaches used to address some of the limitations of projective capacitive touch screens. In this approach, the focus was on measuring the touch force independently from the determination of the touch location by the inclusion of a resistive, piezoelectric, or a capacitive force sensing layer into the projected capacitive touch screen. Accordingly, the location of the touch is determined using the projective capacitive principle, and the magnitude of the force is measured using the added force-sensitive layer.

U.S. Pat. No. 7,538,760 describes the use of a capacitive force sensor to measure the magnitude of the touch force. This touch screen consists of two electrode layers separated by a deformable dielectric membrane, electrodes in an upper layer work in the usual way as a projected capacitance to find the touch location. During the touch, the deformable membrane is squeezed, and the electrodes in the upper layer become closer to the second set of electrodes in the lower layer and their mutual capacitance changes. This change of capacitance is used to measure the magnitude of the touch force.

The use of piezoelectric force sensing principle with projected capacitive technology is described in U.S. Pat. No 0,008,203 A1. In this invention, the touch screen consists of two layers of driving and sensing electrodes that are used to find the touch location. These electrode layers are separated by a piezoelectric layer that responds to an applied pressure and provide an electrical signal to determine the force magnitude.

Incorporation of a force sensing capability into projected capacitance touch screens does not address all the limitations of this technology and, in some cases, adds an extra complexity in the electronic integration as the force sensing elements require another reading circuit that must be synchronized with the touch sensing circuit to simultaneously define the touch location and force. Given this added complexity and the unresolved limitations of the projected capacitance touch technology, there is a need for another touch technology to address these limitations while preserving the advantages of the capacitive touch screens such as high durability, good optical properties and the ability to recognise multiple touches on the display.

In an alternative method from the first approach taken to address the limitations of the projected capacitive touch technology, the second approach is based on the use of force sensors to determine both the location of the touch on the display and the magnitude of the touch force. This concept enables the touch technology to be pressure responsive instead of the dependence on the conductive nature of human body; giving the user the ability to trigger the touch using gloved finger or a nonconductive stylus. Also, this enables the touch controller to receive various input signals from one touch on the screen as the sensor capacitance is a function of the touch intensity. Additionally, the nominal capacitance value of the sensor is known and any changes due to an applied touch is predictable which makes the screen less sensitive to electromagnetic fields and other sources of electronic noise.

As an example of prior attempts on implementing force-based touch screens is the design disclosed in U.S. Pat. No. 8,169,416 B2. It includes a touch screen consisting of a substrate, two electrode layers, an elastic spacer and a transparent touch panel. The substrate is open in the central area and therefore it consists of an outer rim with a first electrode layer placed on top of it. The second electrode layer is separated from the first one by the elastic spacer that is variable in thickness according to the touch force. A transparent touch panel is placed on the upper surface of the second electrode layer to cover the entire front of the display. The electrode layers are patterned to form four or more force sensors arranged around the perimeter of the LCD display. Capacitance variations due to any touch event are measured at all sensors and the results are interpolated to find the location on the screen and measure the magnitude of the force. However, this type of touch screen is not able to detect multiple touches by the user and the sensors are located outside the active display area which leads to unwanted increase in device dimensions.

Force-based touch screens are promising alternatives to enhance the capabilities of touch technology and address its current limitations. However, the technology is still limited due to certain drawbacks of conventional capacitive force sensors. These drawbacks include bulky size of such sensors, non-transparency, sensitivity to lateral forces and the trade-off between sensitivity and dynamic range of force measurement.

In this invention, MEMS capacitive force sensor is disclosed to address the limitations associated with the use of conventional capacitive force sensors in touch screens industry.

SUMMARY OF THE INVENTION

The present invention discloses a novel capacitive force sensor to detect touch forces over a wide range of measurements. The sensor consists of two planar, conductive electrodes separated by an elastic spacer that deforms in a response to an applied touch. The deformation of the elastic spacer minimizes the gap between the sensor electrodes and leads to a change in the nominal capacitance value of the sensor. This change in the capacitance is continuously monitored and measured to reflect the magnitude of the touch force.

The main features of present force sensor are related to the way in which elastic spacers between sensor electrodes are designed. The sensor includes two types of the elastic spacers with different values of stiffness in order to overcome the trade-off between sensitivity and dynamic range of force measurement. These elastic spacers are interposed between sensor electrodes and are offset with a height difference to provide two ranges of force measurement. The first elastic spacer is highly flexible to respond to any slight touches while the second elastic spacer is stiffer and shorter in height to provide additional stiffness for tolerating increased touch forces. This ensures that the sensor is capable of measuring light touch forces with a high sensitivity, and it is capable to withstand heavy applied touch forces.

In the preferred embodiment of the present invention, the sensor consists of an upper panel with touch contact surface, a first conductive electrode, two types of elastic spacers, a second conductive electrode and a substrate. The first elastic spacer includes a number of elastic pillars that are highly flexible and have a length equal to the gap between the two conductive electrodes of the sensor. Theses flexible elastic pillars are arranged at the corners and at the middle location between sensor electrodes to ensure uniform translation of the sensor upper panel during touch. The second elastic spacer includes a number of elastic pillars that are stiffer and shorter compared to the first group of elastic pillars. These stiff elastic pillars are distributed at certain locations along the sensor substrate but do not come into contact with the upper electrode or the inner surface of the upper panel at no load condition.

In the event of an initial applied force, elastic elements that are tall and highly flexible will deform which leads to a decrease in the gap between sensor electrodes and a change in the capacitance value of the sensor. With increased applied loads, the flexible pillars will experience large deformations till they are equal in height with the second group of stiff elastic pillars. Accordingly, the inner surface of the upper panel will be in contact with the surfaces of the stiff elastic pillars. This will introduce an extra stiffness to the system to withstand heavy loads. At this point, both types of elastic pillars will share the load and experience the same deformation.

In another aspect of the invention, a touch-sensitive interface based on the present invention consists of a flexible cover glass, an array of capacitive dual-range force sensors, an LCD display and a flexible circuit board. Force sensors, for this purpose, are made of transparent conductive electrodes (e.g., ITO), transparent elastic spacers (e.g., transparent rubber or polymer) and glass substrates. These sensors are arranged in rows and columns with predetermined horizontal and vertical spacing along the area of the LCD display. The cover glass is made of a thin and flexible glass sheet that is used to cover the sensors and seal the touch-interface module. The Flexible circuit board is used for electrical connection to monitor capacitance changes of the sensors. Any applied force at the interface cover glass will lead to a capacitance change at one or more of the force sensors indicating the position of the touch within the display panel and the magnitude of the touch force.

In yet another aspect of the invention, a touch-sensitive interface based on the present invention consists of a flexible cover glass, a first transparent conductive electrode, a second transparent conductive electrode, a flexible elastic spacer, a stiff elastic spacer, an LCD display and a flexible circuit board. The flexibility of the cover glass is required to preserve the required sensitivity of the sensor, and its inner surface should be patterned to form the upper panels of the sensor units. In this aspect of the invention, sensor second electrode and dielectric spacers are directly deposited on top of the LCD display while the first electrode is deposited and patterned on the inner surface of the outer cover glass. In this embodiment, the frame of the sensor is part from the cover glass and the LCD display. According to this embodiment, the thickness of the sensor can be reduced to few microns. In a similar way as in the previous example of the invention, sensor units are arranged in rows and columns with a predetermined horizontal and vertical spacing along the area of the LCD display. Touching the cover glass of the touch assembly leads to a capacitance change at one or more sensor units. These changes of capacitance are measured to determine both touch location and touch force through an interpolation algorithm. In addition, Sensor units can be used for multiple touch recognition through monitoring capacitance changes at each sensor unit which requires the touch controller to individually access each individual sensor unit in the touch interface. In another aspect, multiple touch recognition can be realized through carefully designed readout circuits with scanning methodology to monitor capacitance changes at sensor rows and columns without the need for the controller to access every sensor.

It will be readily apparent to the one with ordinary skills in the art that this disclosed force sensor may be broadly used in many applications that involve force or displacement inputs, and it is not only limited for touch recognition and touch force measurement. It will also be readily apparent to the one with ordinary skills in the art that the disclosed invention may be altered and modified in different ways without departure from its main idea.

One object of the present invention is to overcome the trade-off between sensitivity and dynamic range of force measurement. Touch force sensors must be highly flexible to provide an adequate user experience and fast response. However, they are also required to be stiff in order to withstand heavy touch forces. The present invention discloses a novel force sensor with dual elastic spacers to provide two ranges of force measurement. The first range is intended for measuring slight touch forces with high sensitivity due to the flexibility of the first group of the elastic spacers. As the force increases, the sensitivity decreases but the sensor is able to withstand heavy applied forces due to the added stiffness by the second group of elastic spacers.

Another object of the present invention is to provide capacitive touch sensing that is independent from the conductive nature of the human body. Touch screens built based on the present invention will be pressure responsive and the touch can be enabled with gloved-fingers, long nails, pens, non-conductive styluses etc.

Another object of the present invention is to overcome the thickness challenge associated with capacitive force sensors when intended for use in the touch screens industry. The force sensors presented in this invention may be made of few microns in thickness.

Another object of the present invention is to overcome the transparency challenge associated with capacitive force sensors when intended for use in the touch screens industry. Convectional capacitive force sensors are made of non-transparent materials which limits their use in touch screen. There are usually placed around the perimeter of the LCD or beneath it, but these approaches are associated with many deficiencies such as reduced sensitivity, unwanted increase in device's dimensions and limited performance.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF THE DRAWINGS

In its main aspect, this invention discloses a novel dual-range capacitive force sensor for touch recognition in hand-held devise such as smartphones, game players, PDA, etc. The disclosed invention focuses on addressing the current limitations and deficiencies of conventional capacitive force sensors such as unwanted thickness, non-transparency, sensitivity to lateral forces, and inability to measure wide range of touch forces with high sensitivity and fast response. This invention may overcome such limitations to enable the development of capacitive touch screens that are pressure responsive and can recognize touches from a non-conductive stylus or heavy gloved-fingers. The disclosed invention is explained in details with reference to the relative drawings and figures. It should be noted that the invention is not only limited to the embodiments explained herein and can include other examples within its scope. It should also be noted that the disclosed sensor may be used for other purposes that includes force, displacement, or weight measurement and it is not only limited for touch recognition in touch screens industry. Furthermore, capacitance changes due to applied forces either in single sensors or the whole touch interface are measured using well-known capacitance reading circuits. Therefore, detailed explanations of the electronic connections are not included.

Figure 1A:
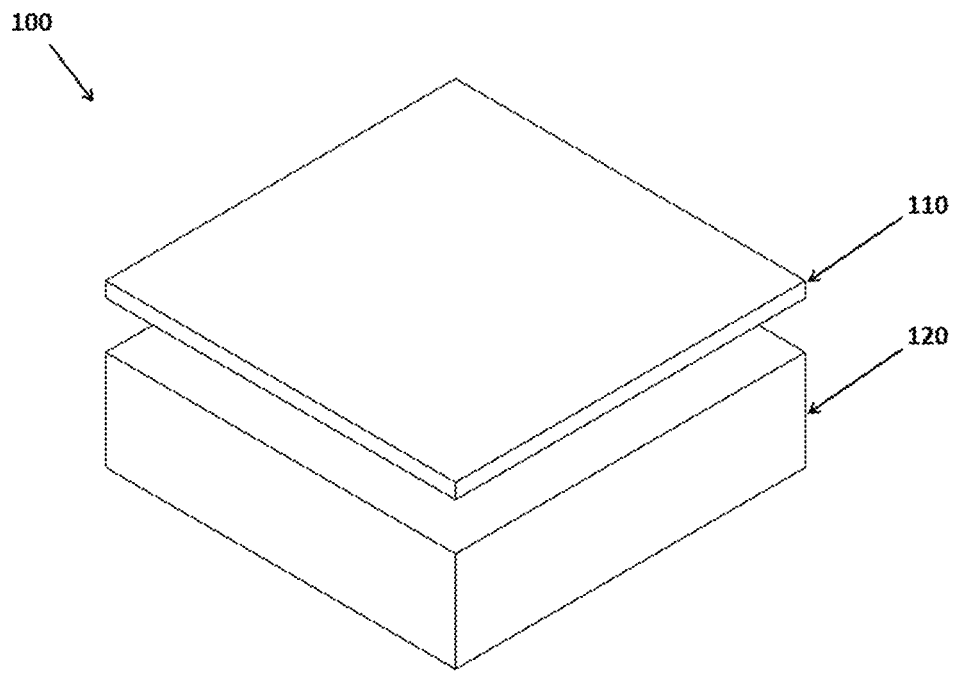
FIG. 1A shows an isometric view of the disclosed dual range capacitive force sensor.
Figure 1B:
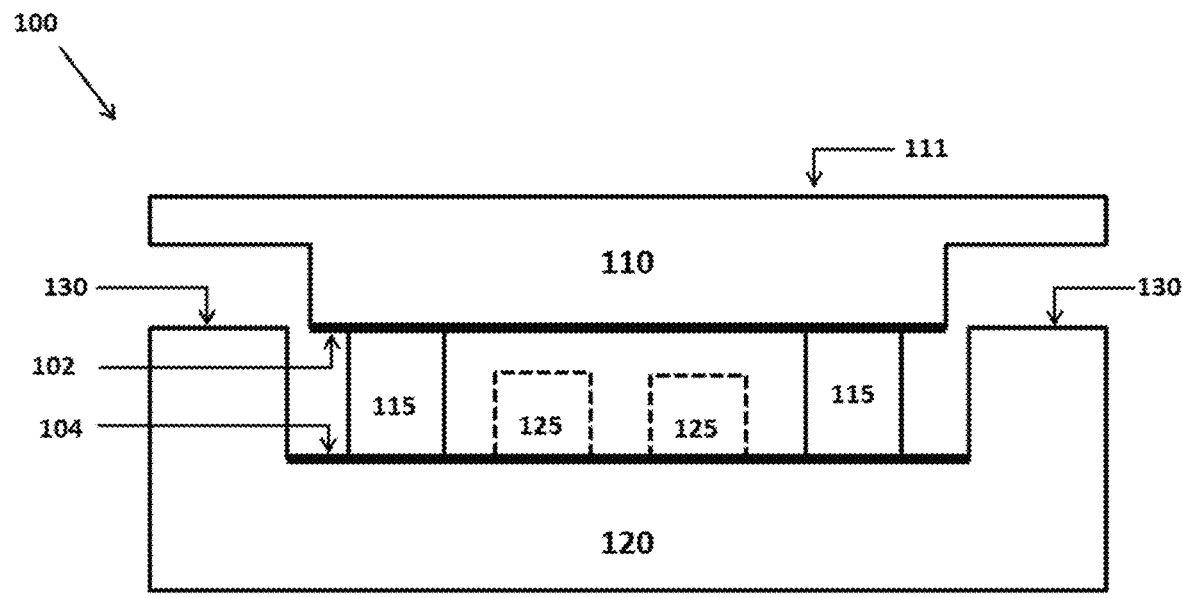
FIG. 1B shows a side view of the dual range capacitive force sensor shown in FIG. 1A.
Figure 2A:
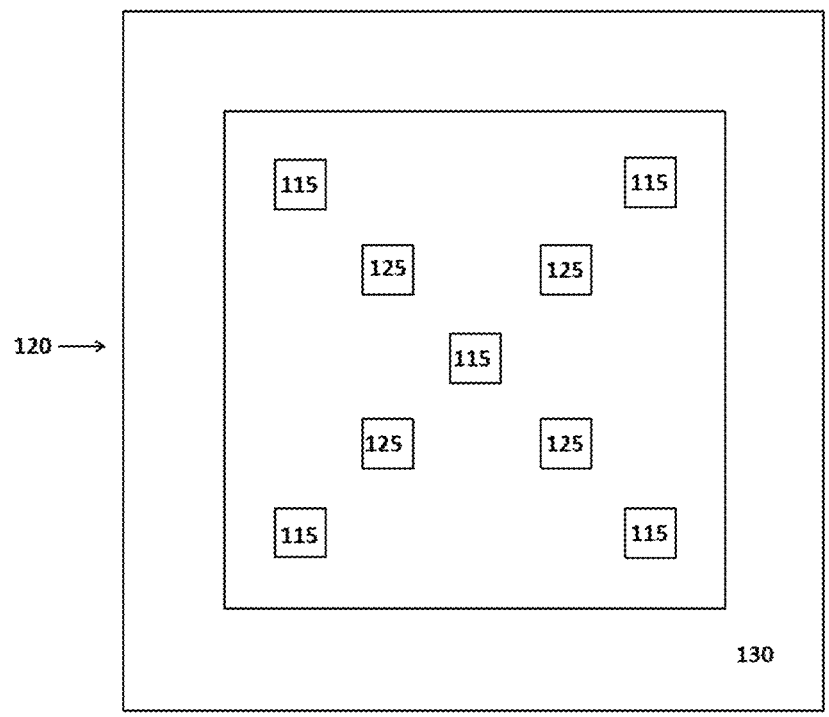
FIG. 2A shows a first example of the placements of the elastic pillars along the substrate of the dual range capacitive force sensor.

The preferred embodiment of the dual-range capacitive force sensor 100 is shown in FIG. 1-3. As shown in FIG. 1A-B, the sensor assembly 100 includes an upper panel 110 with a touch contact surface 111, first and second conductive electrodes 102,104, first and second elastic spacers 115,125, and a substrate 120 with overload protecting contact surface 130. The first conductive electrode 102 is mounted on the inner surface of the upper panel 110. The second conductive electrode 104 is mounted on the top surface of the sensor substrate 120. These Conductive electrodes 102, 104 are placed apart from each other with a certain air gap controlled by the height of the elastic spacers 115. Conductive electrodes can be made of different types of conductive materials (e.g., ITO) based on the conductivity, transparency and good adhesion to a selected material of sensor substrates. The sensor upper panel and the substrate can optionally be made of glass or silicon. Sensor substrate 120 includes flat central area and a raised structure at the edges of the sensor for overload protection. The raised structure surface 130 comes into contact with the sensor upper panel when the applied forces at the touch contact surface reach a predetermined allowable limit.

The first elastic spacer 115 includes a number of elastic pillars mounted between the two conductive electrodes 102,104 to define the initial air gap between sensor electrodes. These elastic pillars 115 are highly flexible to be deformed in a response for any slight touches on the sensor touch contact surface 111. The second elastic spacer 125 includes a number of elastic pillars that are stiffer and shorter compared to the first elastic spacers to add an extra stiffness to the system enabling it to withstand heavy applied loads. The stiff elastic pillars 125 are not in contact with the first electrode 102 at no lead condition due to the height offset between the two types of elastic spacers. This height difference is defined based on the force limit between slight and heavy touch forces within the intended range of force measurement.

Flexible and stiff Elastic spacers are distributed along the sensor substrate with respect to each other. In the preferred embodiment of the invention FIG. 2A, the first elastic spacer 115 consists of five flexible pillars arranged at the centre location and the four corners of the sensor substrate 120. As stated above, these flexible elastic pillars are also in contact with the middle location and the four corners of the upper moving panel of the sensor in order to ensure uniform translation and minimize unwanted internal deflections within the upper panel. The second elastic spacer 125 consists of four pillars located at the four sides around the centre of the sensor substrate. In this example, elastic pillars, in both categories, have the same area, and the difference in stiffness is achieved by using two different types of deformable materials for the fabrication of flexible and stiff elastic spacers.

Figure 2B:
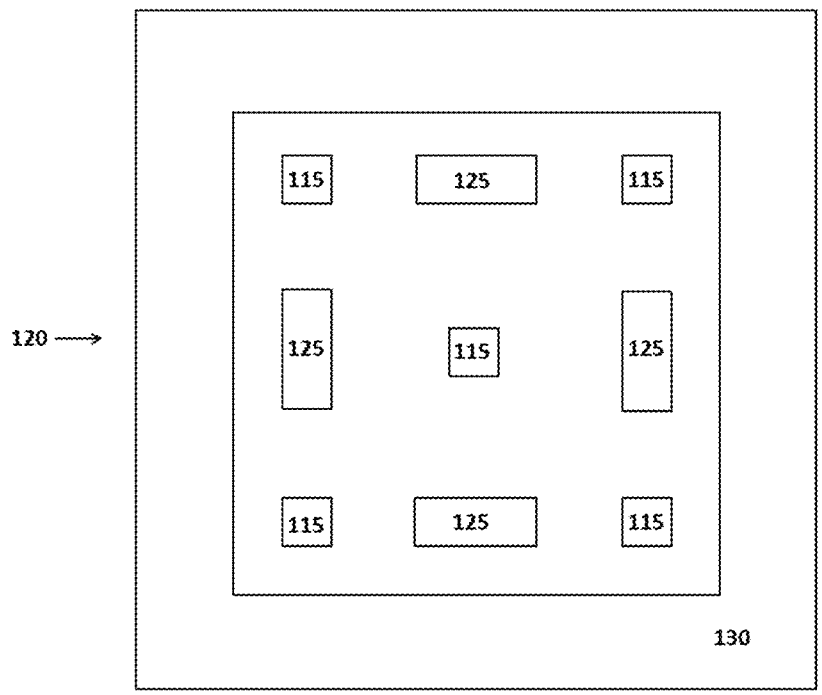
FIG. 2B shows a second example of the placements of the elastic pillars along the substrate of the dual range capacitive force sensor.

In another example of the invention FIG. 2B, the two types of elastic spacers may be made from the same deformable material but with different dimensions to vary the stiffness value between flexible and stiff elastic pillars. As in the previous embodiment, the first elastic spacer 115 consists of five flexible pillars arranged at the centre location and the four corners of the sensor substrate 120. The second elastic spacer 125 consists of four elastic pillars located at the four sides of the substrate. These elastic pillars are made with larger area compared to the pillars in the first group in order to be stiffer for withstanding heavy applied touch forces. It would be apparent to the one who is skilled in the art that the number of elastic elements in each group and the placement of these pillars along the substrate are not limited to the ones explained in these two examples of the invention.

Figure 3A:
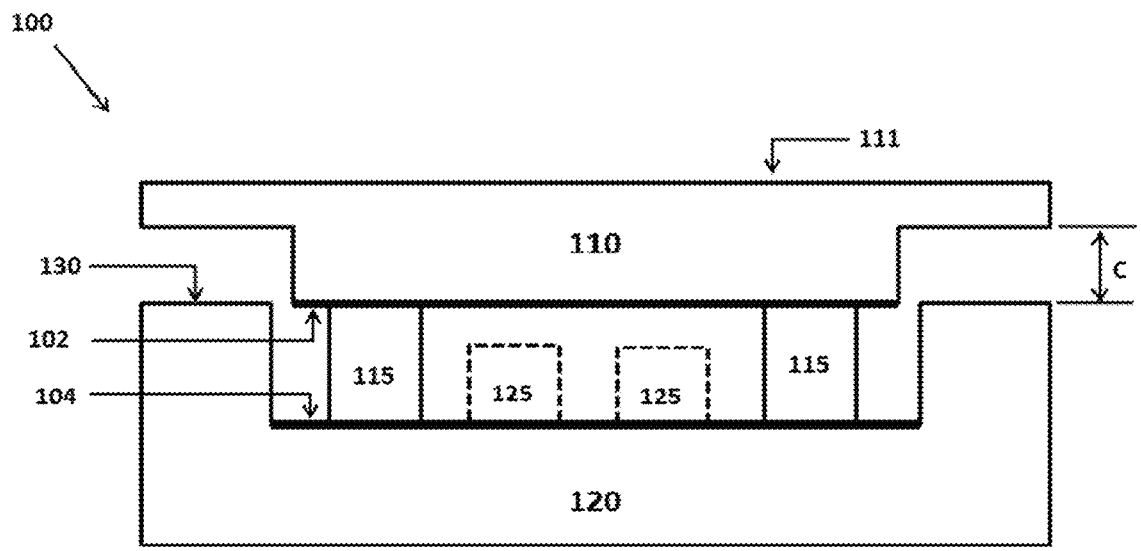
FIG. 3A shows the dual range capacitive force sensor at rest, no external load is applied
Figure 3B:
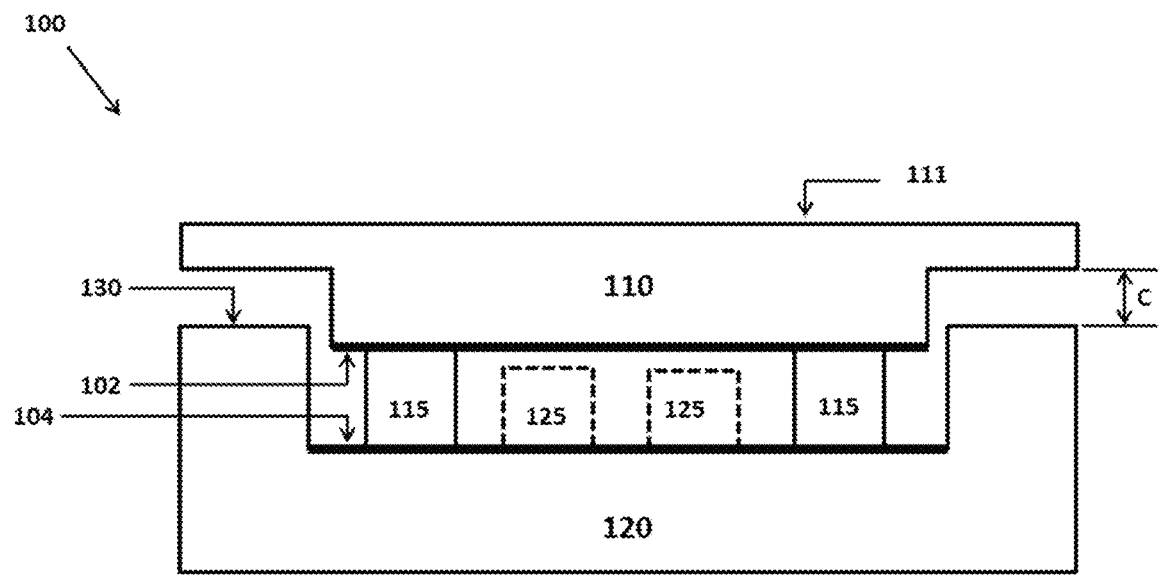
FIG. 3B shows the dual range capacitive force sensor during the application of slight touch forces that only deform the flexible elastic spacers.
Figure 3C:
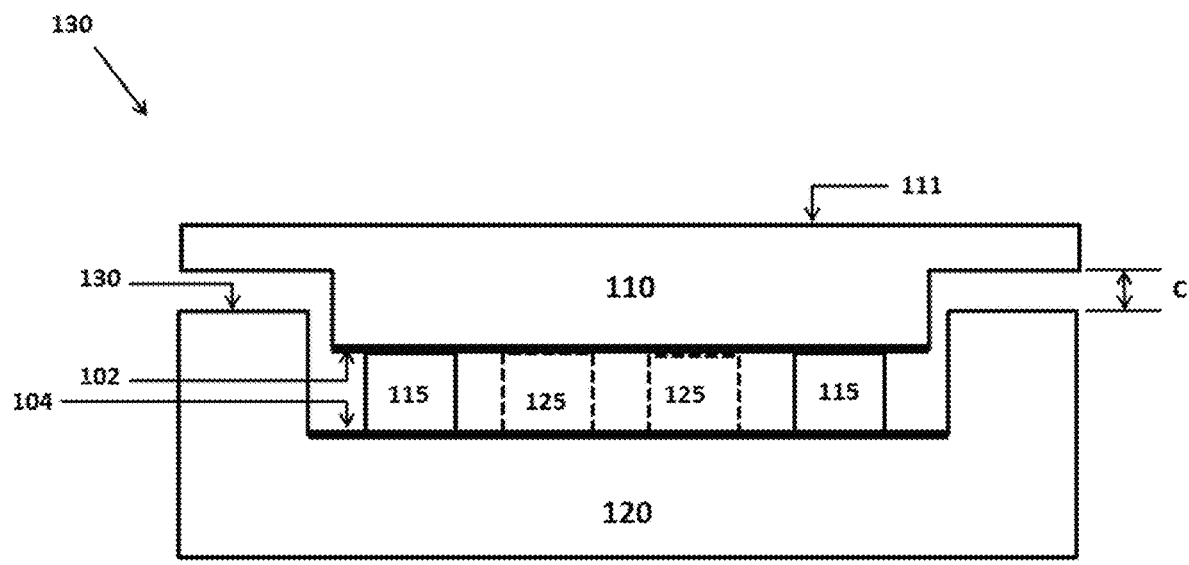
FIG. 3C shows the dual range capacitive force sensor during force application where the sensor upper panel reaches the stiff elastic pillars, and both elastic spacers, flexible and stiff, share the load.
Figure 3D:
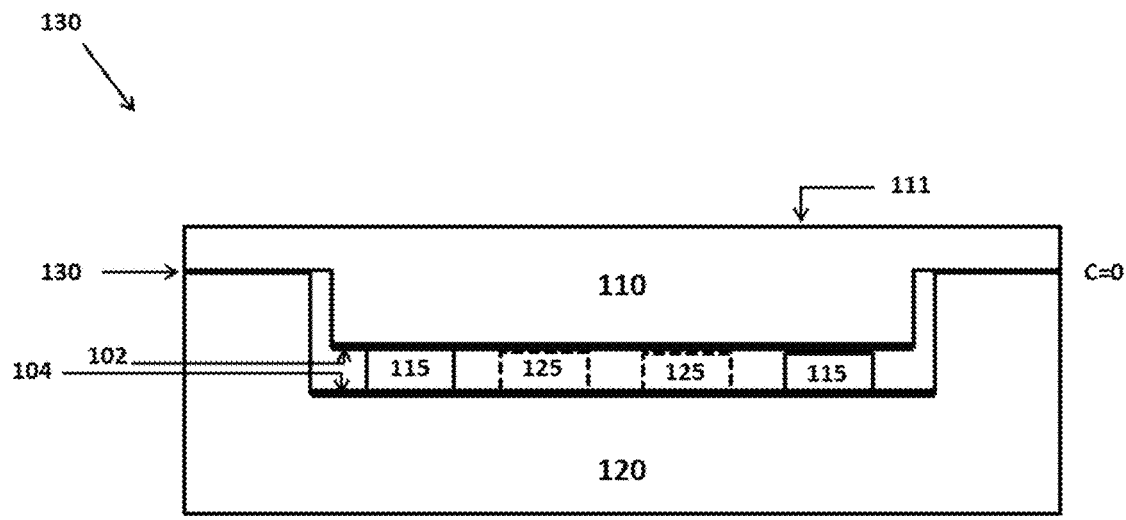
FIG. 3D shows the dual range capacitive force sensor during the application of the maximum allowable force, where the moving panel of the sensor reaches overload protection surface.

As discussed above, the overlapping area between sensor electrodes and the initial air gap determine the nominal capacitance value of the sensor. The deformation of the elastic spacers, due to an applied force, minimizes the air gap between sensor electrodes and changes the nominal capacitance value of the sensor. Capacitance changes are measured to reflect the magnitude of the touch force. Initially, the moving panel of the sensor is at rest at no load applied as shown in FIG. 3A, and there is no change in the capacitance value of the sensor. As external force is applied at the touch contact surface 111, the flexible elastic elements 115 deform by the upper moving panel of the sensor 110, and the capacitance value of the sensor is altered to a new value due to the gap reduction between the sensor electrodes as depicted in FIG. 3B. The flexible elastic elements 115 experience more deformation as the touch force increases, and the change in capacitance value increases to reflect the increase in the touch force. The inner surface of the sensor upper panel reaches the upper surface of the stiff elastic elements 125 when the touch force reaches a predetermined intermediate limit value as shown in FIG. 3C. The force values from zero to the intermediate value define the high sensitivity region of the sensor operation where the sensor is highly sensitive to respond to any slight touches on the touch contact surface. At this point, Elastic pillars 115,125 are equal in height, and the upper moving panel is in contact with the two groups of elastic spacers as depicted in FIG. 3C. The total stiffness of the system is increased due to the additional stiffness added by the second group of elastic pillars 125. Accordingly, increasing the touch force creates less deformation compared to the first range of sensor operation. Both flexible and stiff elastic elements experience the same deformation for increased touch forces until the upper panel of the sensor reaches the overload protection contact surface 130 as shown in FIG. 3D. This defines the second region of sensor operation where the sensitivity is reduced but the sensor becomes capable to withstand heavy applied touch forces.

Figure 4:
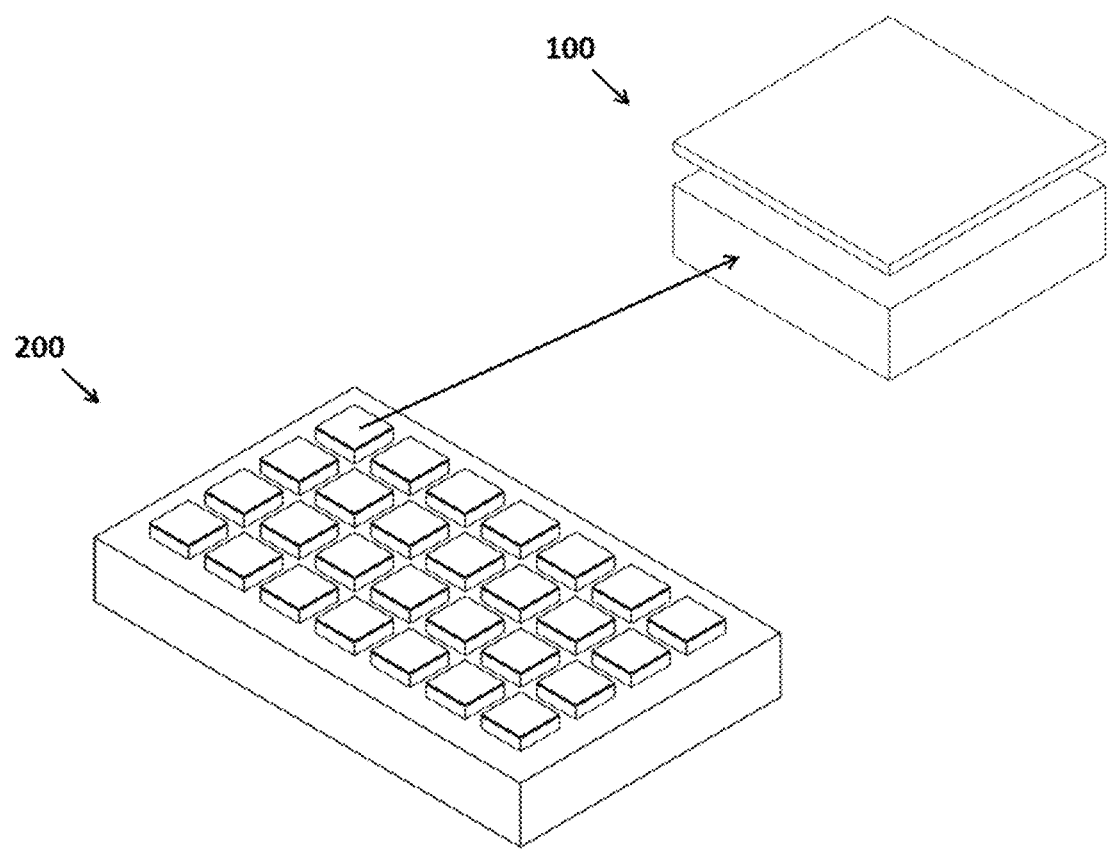
FIG. 4 shows a prospective view of the first embodiment of the force-based touch interface based on the dual range capacitive force sensor shown in FIG. 1.

FIG. 4-9 illustrate a force-based touch interface based on the disclosed dual range capacitive force sensor. The touch interface 200 includes a plurality of force sensor units 100 arranged in rows and columns as depicted in FIG. 4. Conventionally, capacitive force sensors are placed beneath the LCD display due to the non-transparency of the materials used to make the sensors. However, this reduces the sensitivity of force measurement as force is transferred to the sensor by deforming both the cover glass and the LCD display. In another approach, conventional force sensors are also placed around the perimeter of the LCD for non-transparency and thickness considerations. However, this option leads to unwanted increase in the lateral dimensions of the handheld device and complicates the capability of providing multiple touch recognition. The advantageous feature of the present invention is that the disclosed force sensor may be made of transparent materials with a small thickness that can be reduced to few microns. Hence, theses sensor units can be placed on top of the LCD display to provide high sensitivity and multiple touch recognition without obscuring the view of the devise's display.

Figure 5:
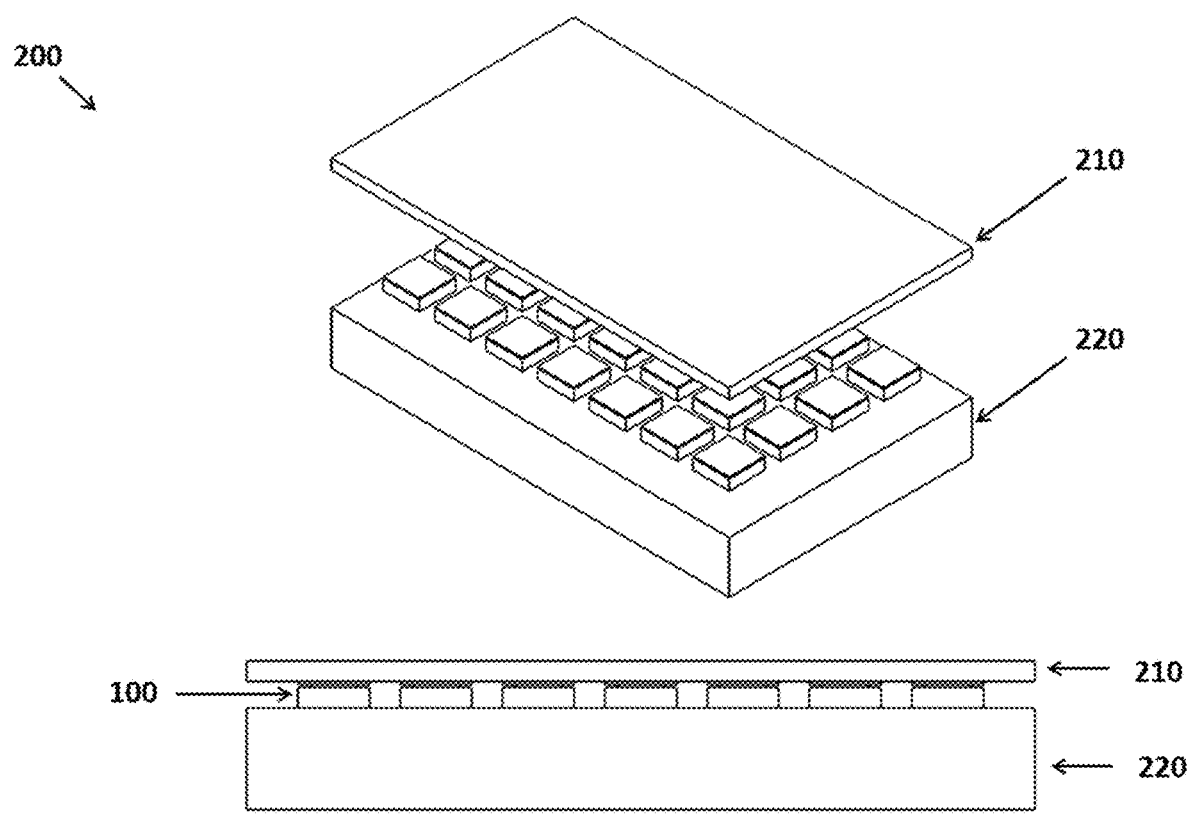
FIG. 5 shows an exploded and side views of the force-based touch interface shown in FIG. 4.
Figure 6:
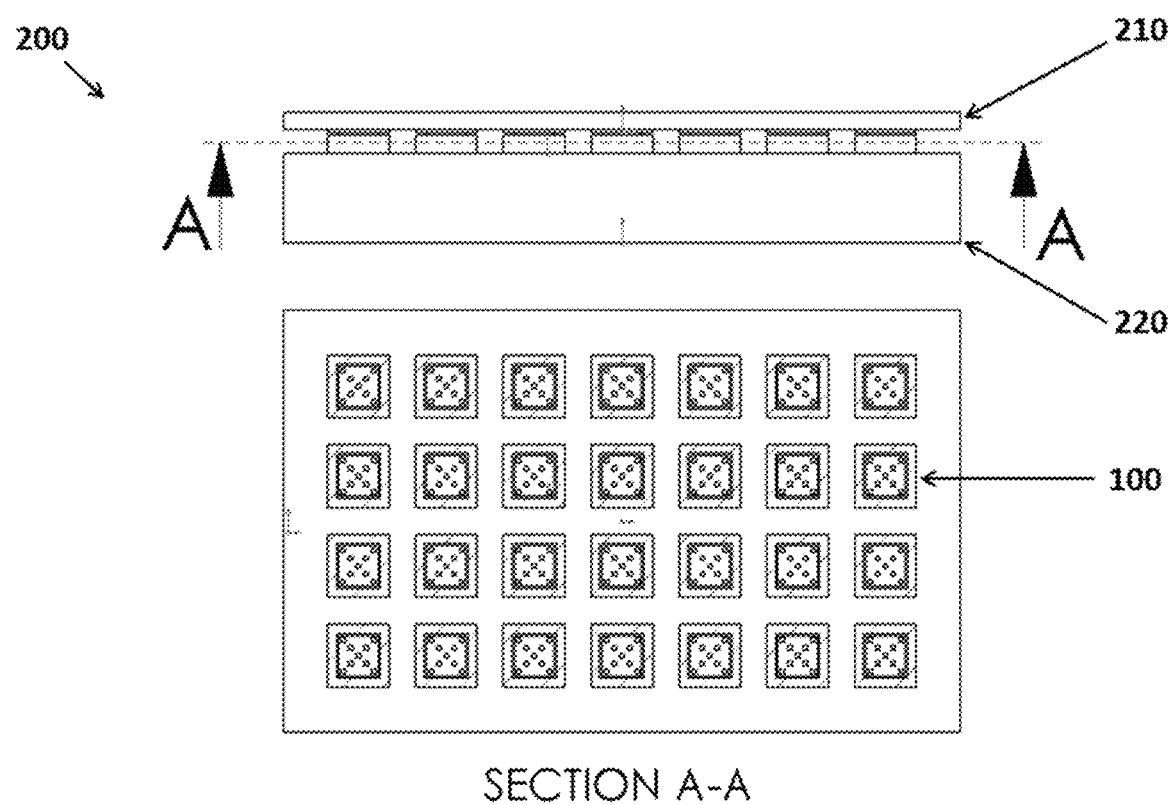
FIG. 6 shows a side and cross section views of the force-based touch interface shown in FIG. 4.
Figure 7:
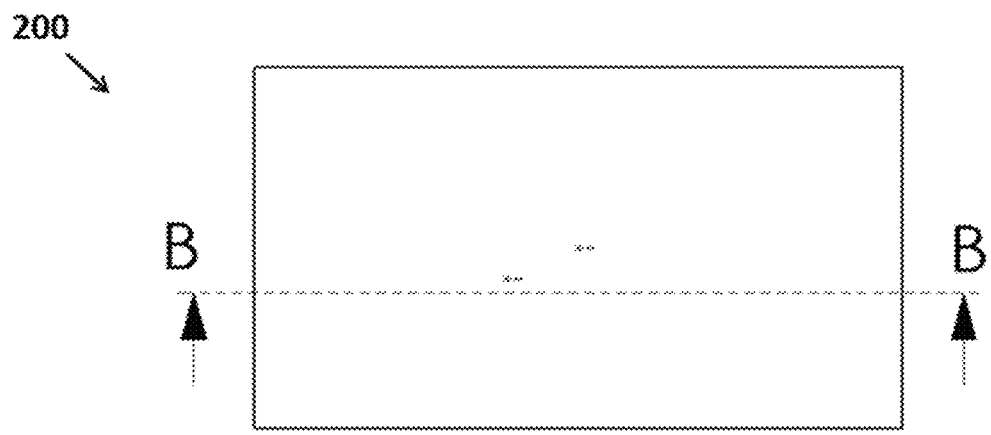
FIG. 7 shows a top, cross section and detailed views of the force-based touch interface shown in FIG. 4.
Figure 7:
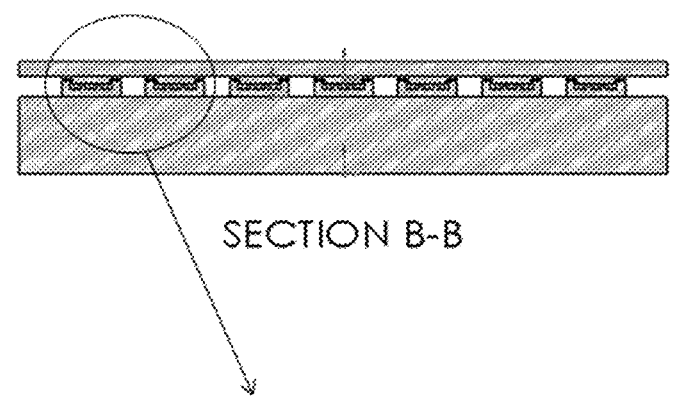
Figure 7:
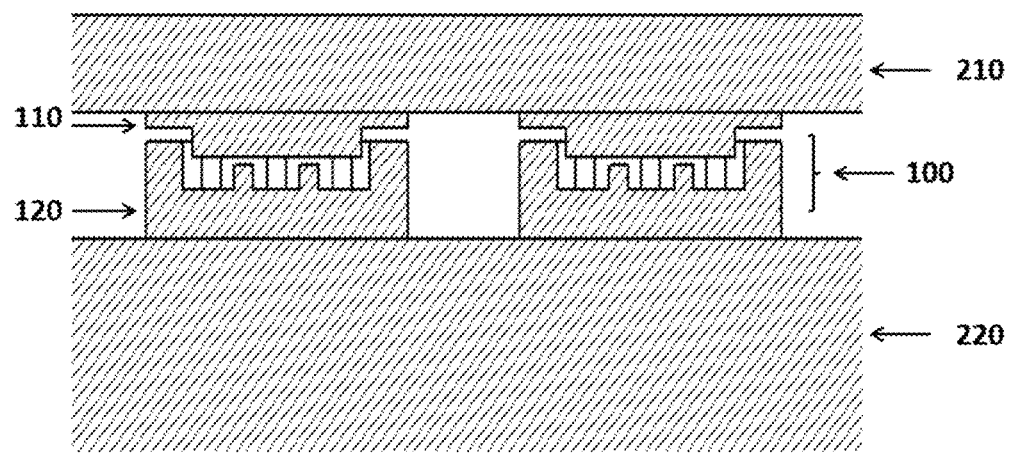

The first embodiment of the force-based touch interface is shown in FIG. 5-7. The touch interface 200 includes a flexible cover glass 210, an array of force sensor units 100 and an LCD display 220. The cover glass 210 is preferred to be thin and flexible to ensure the transfer of input forces to the force sensors beneath it. The sensor units 100 are arranged in rows and columns and interposed between the cover glass 210 and the LCD display 220. The required number of force sensor units is determined based on the size of the touch screen and the required touch resolutions. In the event of a touch, the flexible cover glass deforms to transfer the force to the upper panels of the sensor units within the active touch area. This leads to a capacitance change in one or more sensor units to reflect the touch location and the magnitude of the touch force. As discussed above, each sensor unit includes flexible and stiff elastic spacers to provide dual range of force measurement. Flexible elastic spacers play an important role in providing high sensitive recognition for slight touches on the screen. Stiff elastic spacers enable the touch sensors to withstand heavy applied touches. The combined use of both flexible and stiff elastic spacers within every sensor unit provides a touch assembly that can recognize wide range of applied touch forces.

Figure 8:
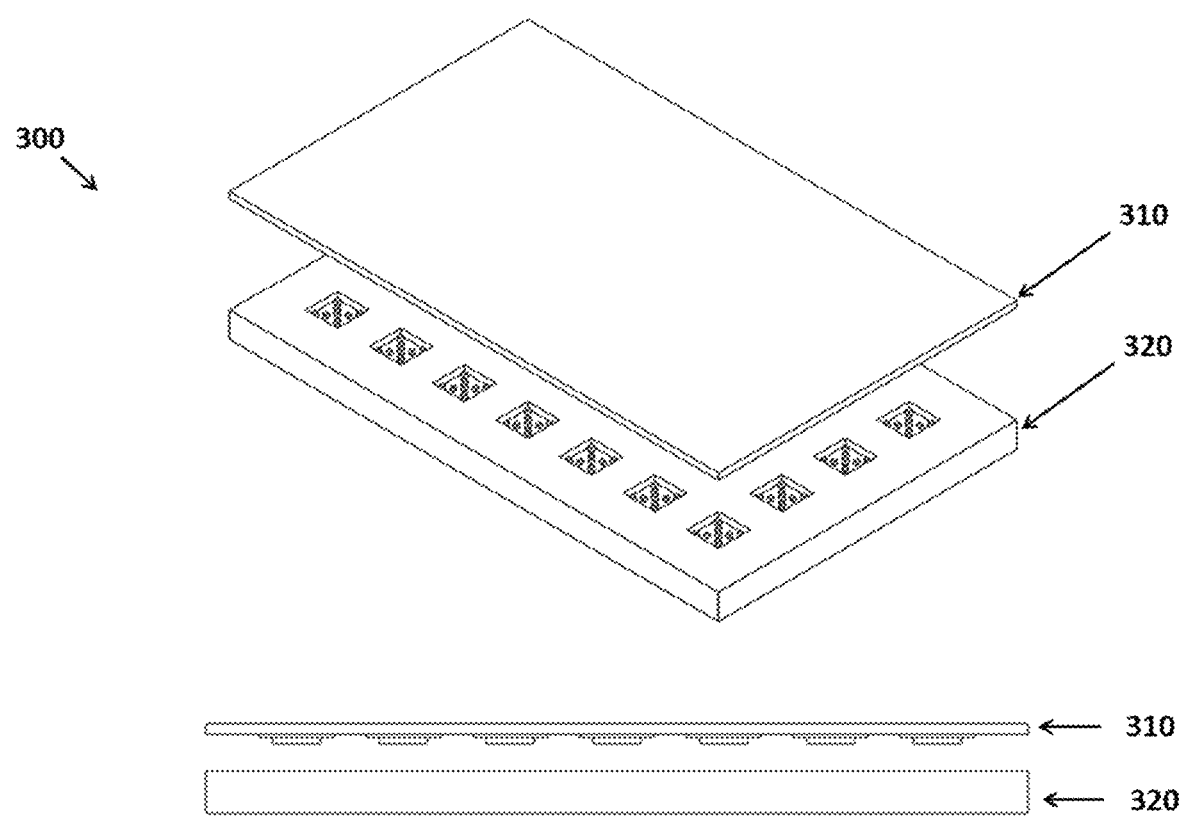
FIG. 8 shows an exploded view of the second embodiment of the force-based touch interface based on the dual range capacitive force sensor shown in FIG. 1.
Figure 9:
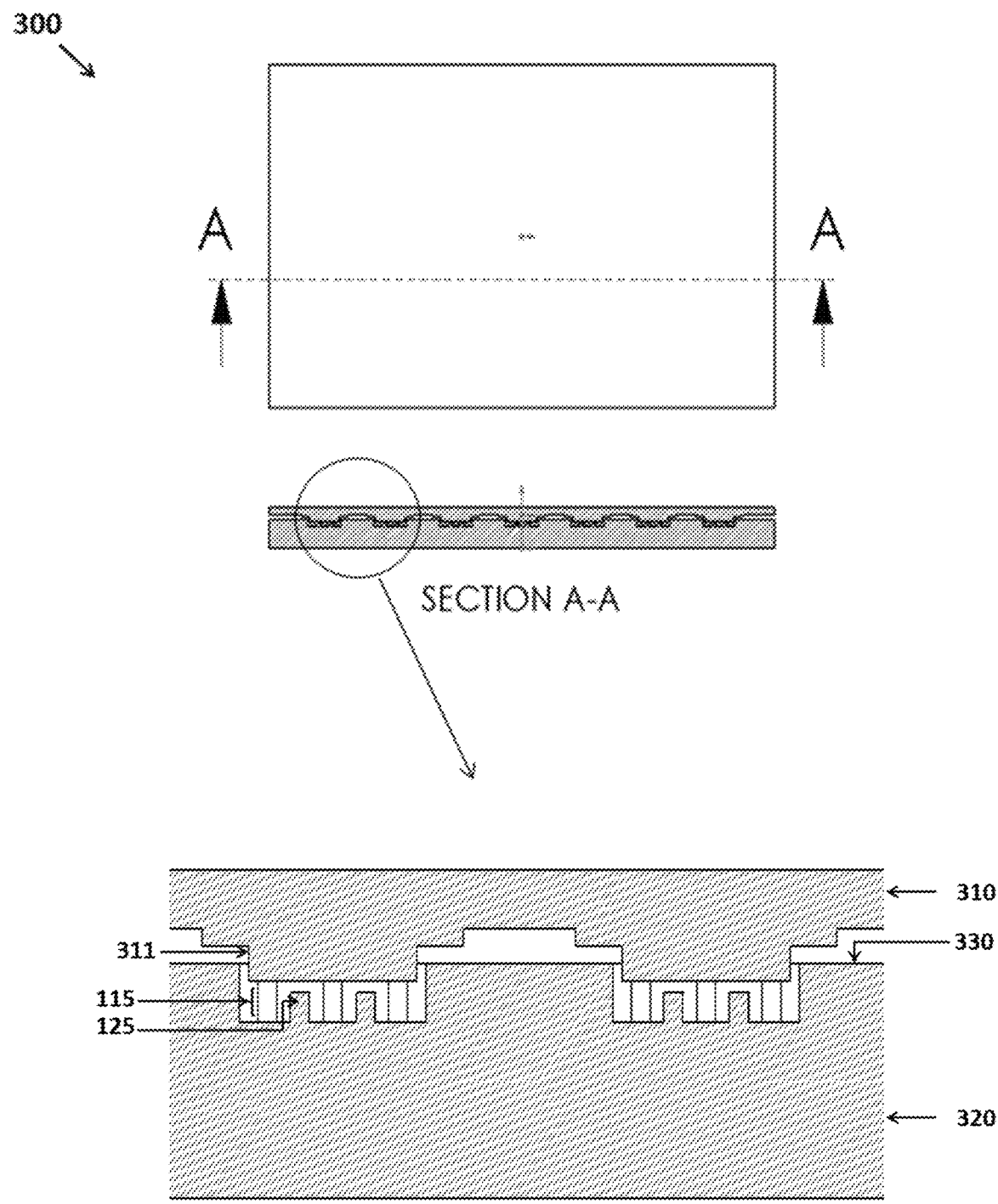
FIG. 9 shows a top, cross section and detailed views of the force-based touch interface shown in FIG. 8.

In a second embodiment, force sensors are not used as standalone units interposed between the cover glass and the LCD display. As shown in FIG. 8, the upper panels and the substrates of the sensor units are made as parts of the cover glass and the LCD assembly, respectively. The upper panels of the sensors 311 are made of a stiff glass, but they are connected and covered with a flexible glass sheet 310 that seals the touch interface and enables the transfer of force to sensor units based on the location of the touch within the screen area. The LCD display 320 of the touch interface 300 is covered by thin glass sheet with raised structures for overload protecting. Lower conductive electrodes and the two types of elastic spacers, for all sensor units, are directly deposited on the LCD cover, and the upper conductive electrodes are made on the inner surfaces of the upper panels as shown in FIG. 9. Applied touch forces deform the cover glass to compress the elastic spacers and lead to a capacitance change at one or more sensor units within the touch interface. Capacitance changes are monitored to detect the touch location within the screen.

What is claimed is:
1. A dual range capacitive MEMS force sensor, the force sensor comprising:
 a) a moving upper panel having a lower surface and an upper touch surface to receive a touch force;
 b) a fixed substrate having a top surface and an overload protection surface to protect the sensor from excessive applied touch forces, c) a first set of planar conductive electrodes mounted on the lower surface of the moving upper panel;
d) a second set of planar conductive electrodes mounted on the top surface of the fixed substrate;
e) the first and the second planar conductive electrodes are separated by a predetermined distance defining an initial capacitance value of the force sensor;
f) a first set of elastic spacers comprising of a set of flexible pillars, each flexible pillar having a low stiffness, a long height and a first surface area;
g) a second set of elastic spacers comprising of a set of stiff pillars, each stiff pillar having a high stiffness, a short height and a second surface area;
   wherein the first and the second set of elastic spacers are interposed between the first and the second set of planar conductive electrodes to control the changes in a distance between the first and the second set of planar conductive electrodes according to an applied external force, and
   wherein the set of flexible pillars have low stiffness to respond to small applied forces while the set of stiff pillars have high stiffness to respond to large applied forces, and
   wherein the long heights of the set of flexible pillars are longer than the short heights of the set of stiff pillars for tolerating higher applied forces,
   whereby small applied forces deform the set of flexible pillars and can be sensed with a high sensitivity, and as the applied force increases, the stiffness of the force sensor increases when the moving upper panel reaches the set of stiff pillars at a predetermined intermediate limit force, whereby in this range of applied forces from the intermediate limit value to a maximum force, the sensitivity reduces due to increased stiffness, and the force sensor can measure a wide range of touch forces.

2. The capacitive MEMS force sensor of claim 1, wherein the set of flexible pillars comprise of five pillars that are in contact with moving upper panel.

3. The capacitive MEMS force sensor of claim 1, wherein the set of stiff pillars comprise of four pillars arranged with respect to the set of flexible pillars.

4. The capacitive MEMS force sensor of claim 1, wherein the first surface areas of the set of flexible pillars and the second surface areas of the set of stiff pillars are equal.

5. The capacitive MEMS force sensor of claim 1, wherein the first surface areas of the set of flexible pillars and the second surface areas of the set of stiff pillars are different.

6. The capacitive MEMS force sensor of claim 1, wherein the stiffness of the set of stiff pillars is larger than the stiffness of the set of flexible pillars.

7. The capacitive MEMS force sensor of claim 1, wherein the low stiffness and the high stiffness are controlled by a material and chemical composition of each pillar.

8. The capacitive MEMS force sensor of claim 1, wherein the moving upper panel moves by less than 2 microns.

9. The capacitive MEMS force sensor of claim 1, having a 10 microns thickness.

10. A touch interface, comprising:
a) a flexible cover glass that seals the touch interface;
b) an LCD display that provides an interaction medium;
c) an array of force sensors interposed between the flexible cover glass and the LCD display, each force sensor comprising:
   i) a moving upper panel having a lower surface and an upper touch surface to receive a touch force;
   ii) a fixed substrate having a top surface and an overload protection surface to protect the sensor from excessive applied touch forces,
   iii) a first set of planar conductive electrodes mounted on the lower surface of the moving upper panel;
   iv) a second set of planar conductive electrodes mounted on the top surface of the fixed substrate;
   v) the first and the second planar conductive electrodes are separated by a predetermined distance defining an initial capacitance value of the force sensor;
   vi) a first set of elastic spacers comprising of a set of flexible pillars, each flexible pillar having a low stiffness, a long height and a first surface area;
   vii) a second set of elastic spacers comprising of a set of stiff pillars, each stiff pillar having a high stiffness, a short height and a second surface area;
      wherein the first and the second set of elastic spacers are interposed between the first and the second set of planar conductive electrodes to control the changes in a distance between the first and the second set of planar conductive electrodes according to an applied external force, and
      wherein the set of flexible pillars have low stiffness to respond to small applied forces while the set of stiff pillars have high stiffness to respond to large applied forces, and
      wherein the long heights of the set of flexible pillars are longer than the short heights of the set of stiff pillars for tolerating higher applied forces,
d) a flexible circuit board for monitoring changes in a capacitance at each force sensor,
   whereby applied touch forces squeeze the cover glass and lead to a capacitance change at one or more of the force sensors indicating the position of the touch within the LCD display panel and the magnitude of the touch force, whereby the change of capacitance is monitored at all force sensors, and the exact location is determined using an interpolation algorithm.

11. The touch interface of claim 10, comprising a set of transparent conductive electrodes, a set of transparent elastic spacers, and a glass substrates, whereby making the touch interface transparent, thereby force sensors can be placed on the top of LCD to improve sensor sensitivity to detect touches on the screen, whereby in non-transparent sensors they are placed beneath the LCD, which makes them less sensitive.

12. The interface of claim 10, wherein the array of force sensor are arranged in rows and columns between the cover glass and the LCD display, and wherein a number of sensors in each row and a number of rows are provided based on a screen size and a required touch resolution.

13. The interface of claim 10, wherein the array of force sensors are an integral part of the cover glass and the LCD display.

14. The touch interface of claim 10, wherein the cover glass comprises of a set of stiff upper panels that are connected and covered with a flexible and thin glass sheet to seal the touch interface.

15. The force-based touch interface of claim 10, wherein the set of transparent conductive electrodes are deposited on the lower surface of the moving upper panels within the cover glass.

16. The touch interface of claim 10, wherein the LCD display is covered with a patterned thin glass sheet to form overload protection surfaces that come into contact with the moving upper panels when a maximum allowable force is applied.

17. The touch interface of claim 10, wherein the flexible and the stiff pillars along with a second transparent conductive electrode are placed on the LCD display at an aligned location with moving upper panels and the first set of planar conductive electrodes within the cover glass assembly.

18. The force-based touch interface of claim 10, wherein each force sensor is individually accessed by a touch controller to locate a touch and measure the magnitude of the touch force.

19. The force-based touch interface of claim 10, wherein the array of force sensor have an electronic connection system to enable a multi-touch recognition.

* * * * *